US009432551B2

(12) United States Patent
Sawada

(10) Patent No.: US 9,432,551 B2
(45) Date of Patent: Aug. 30, 2016

(54) IMAGE PROCESSING APPARATUS CONFIGURED TO EXECUTE CORRECTION ON SCAN IMAGE DATA

(71) Applicant: BROTHER KOGYO KABUSHIKI KAISHA, Nagoya, Aichi (JP)

(72) Inventor: Kazuhide Sawada, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 0 days.

(21) Appl. No.: 14/663,589

(22) Filed: Mar. 20, 2015

(65) Prior Publication Data
US 2015/0281520 A1    Oct. 1, 2015

(30) Foreign Application Priority Data
Mar. 28, 2014  (JP) ................................ 2014-070573

(51) Int. Cl.
*H04N 1/04*  (2006.01)
*H04N 1/40*  (2006.01)

(52) U.S. Cl.
CPC ................................ *H04N 1/40093* (2013.01)

(58) Field of Classification Search
CPC ................................................ H04N 1/40093
USPC ................................ 358/1.9, 1.13, 1.14, 474
See application file for complete search history.

(56) References Cited

U.S. PATENT DOCUMENTS

2010/0027072 A1*  2/2010  Enjuji .................... G06T 5/009
                                                      358/3.01

FOREIGN PATENT DOCUMENTS

JP          2007-081882 A       3/2007

* cited by examiner

*Primary Examiner* — Houshang Safaipour
(74) *Attorney, Agent, or Firm* — Scully, Scott, Murphy & Presser, PC

(57) ABSTRACT

An image processing apparatus acquires scan data and information about a color specified by a user; executes first correction on the scan data such that brightness of a pixel subject to the first correction increases, the pixel subject to the first correction having a color that falls within a specified range of color, an achromatic color brighter than the specified color falling within the specified range of color, first corrected scan data being generated resulting from execution of the first correction; executes second correction on at least a part of the first-corrected scan data such that a color of a pixel subject to the second correction is changed to a predetermined color if the pixel subject to the second correction is a specified color pixel specified based on the information, second corrected scan data being generated resulting from execution of the second correction; and outputs the second corrected scan data.

20 Claims, 11 Drawing Sheets

$Hi = \arctan(Cbi/Cri)$ $Ci = \sqrt{Cbi^2 + Cri^2}$ $Hs = Hi - \Delta H$ $He = Hi + \Delta H$

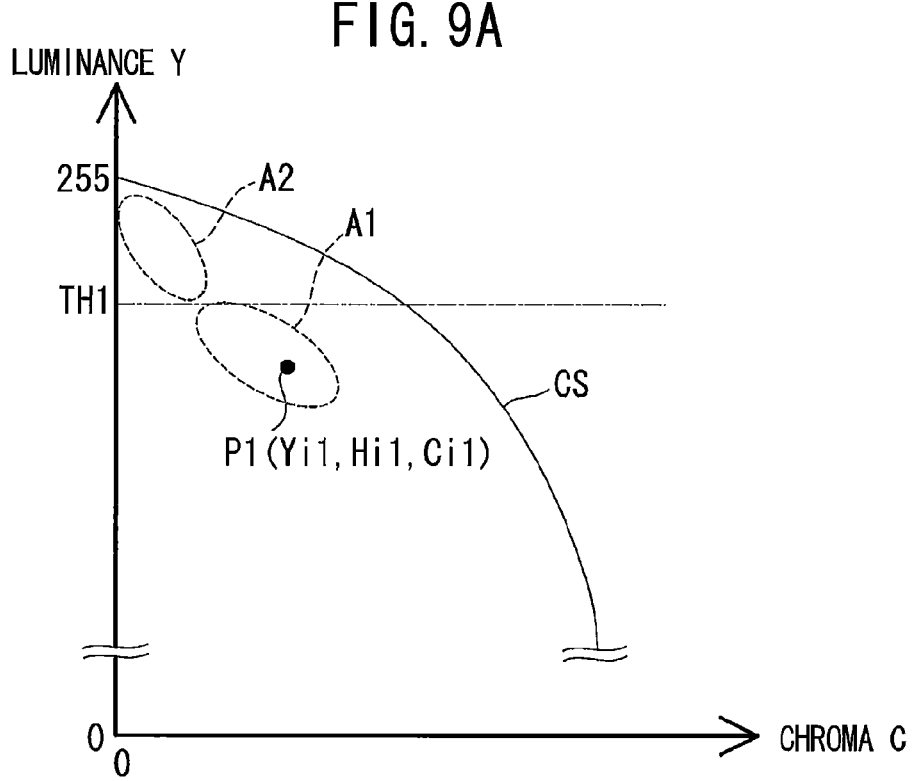
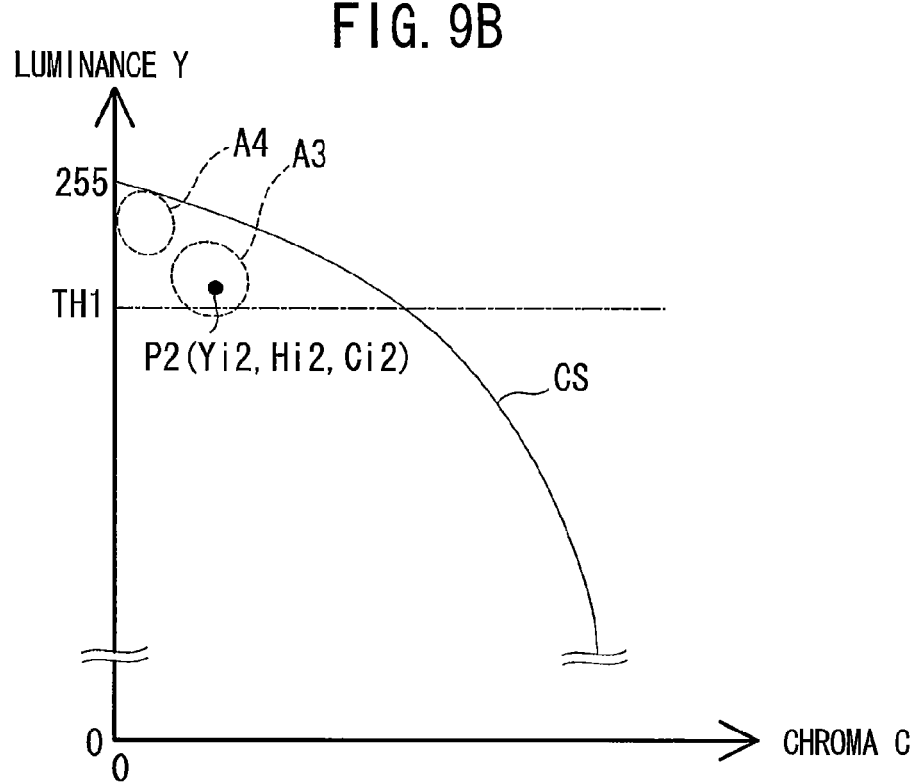

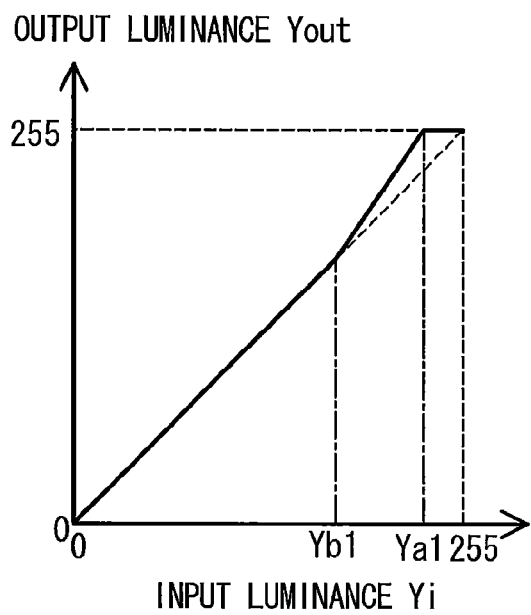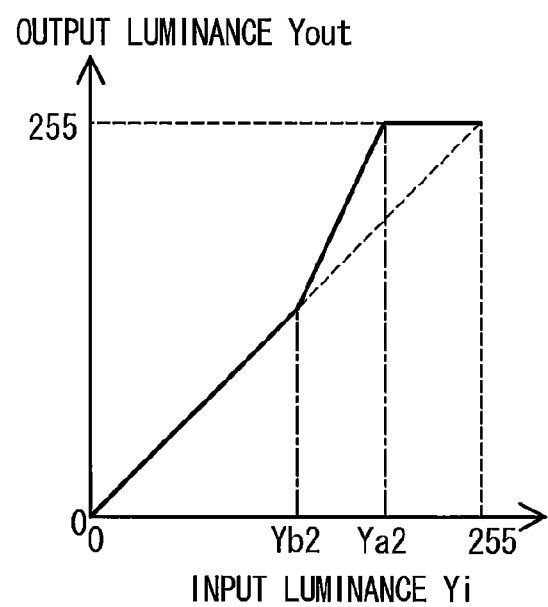

IMAGE PROCESSING APPARATUS CONFIGURED TO EXECUTE CORRECTION ON SCAN IMAGE DATA

CROSS REFERENCE TO RELATED APPLICATION

This application claims priority from Japanese Patent Application No. 2014-070573 filed Mar. 28, 2014. The entire content of the priority application is incorporated herein by reference.

TECHNICAL FIELD

The present disclosure relates to an image processing apparatus.

BACKGROUND

There is known correction processing for changing a color specified in a scan image represented by scan data to another color. As an example of the correction processing, deleting an object of a specified color from a scan image is performed by changing the specified color in the scan image to a background color. For example, if a scan image includes ruled lines and characters, this correction processing can be used to delete the ruled lines from the scan image before executing character recognition processing, thereby improving recognition accuracy of the characters in the scan image.

SUMMARY

However, in the above-described correction processing, an edge of an object of a specified color may remain in the scan image on which the correction processing has been performed. For example, in a case where anti-aliasing is performed on the ruled line in the scan image, an edge of the ruled line may remain in the corrected scan image because the edge is blurred. Consequently, recognition accuracy of the characters in the corrected scan image may be degraded.

In view of the foregoing, it is an object of the disclosure to provide an image processing apparatus capable of preventing an edge of an object having a specified color from remaining in a scan image on which correction processing has been performed.

In order to attain the above and other objects, the disclosure provides an image processing apparatus that may include a controller. The controller is configured to: acquire scan data representing a scan image, the scan image including a plurality of pixels; acquire information about a color specified by a user; execute, if a predetermined condition is met, a first correction on at least a part of the scan data such that brightness of a pixel subject to the first correction increases, the pixel subject to the first correction having a color that falls within a specified range of color, an achromatic color that is brighter than the specified color falling within the specified range of color, first corrected scan data being generated resulting from execution of the first correction; execute, if the first correction is executed, a second correction on at least a part of the first-corrected scan data such that a color of a pixel subject to the second correction is changed to a predetermined color if the pixel subject to the second correction is a specified color pixel specified based on the information, second corrected scan data being generated resulting from execution of the second correction on the first corrected scan data; and output the second corrected scan data if the second correction is executed.

According to another aspect, the present disclosure provides a non-transitory computer readable storage medium storing a set of program instructions executed by a computer. The program instructions may include: acquiring scan data representing a scan image, the scan image including a plurality of pixels; acquiring information about a color specified by a user; executing, if a predetermined condition is met, a first correction on at least a part of the scan data such that brightness of a pixel subject to the first correction increases, the pixel subject to the first correction having a color that falls within a specified range of color, an achromatic color that is brighter than the specified color falling within the specified range of color, first corrected scan data being generated resulting from execution of the first correction; executing, if the first correction is executed, a second correction on at least a part of the first-corrected scan data such that a color of a pixel subject to the second correction is changed to a predetermined color if the pixel subject to the second correction is a specified color pixel specified based on the information, second corrected scan data being generated resulting from execution of the second correction on the first corrected scan data; and outputting the second corrected scan data if the second correction is executed.

According to another aspect, the present disclosure provides an image processing apparatus. The image processing apparatus includes means for acquiring scan data representing a scan image, the scan image including a plurality of pixels; means for acquiring information about a color specified by a user; means for executing, if a predetermined condition is met, a first correction on at least a part of the scan data such that brightness of a pixel subject to the first correction increases, the pixel subject to the first correction having a color that falls within a specified range of color, an achromatic color that is brighter than the specified color falling within the specified range of color, first corrected scan data being generated resulting from execution of the first correction; means for executing, if the first correction is executed, a second correction on at least a part of the first-corrected scan data such that a color of a pixel subject to the second correction is changed to a predetermined color if the pixel subject to the second correction is a specified color pixel specified based on the information, second corrected scan data being generated resulting from execution of the second correction on the first corrected scan data; and means for outputting the second corrected scan data if the second correction is executed.

BRIEF DESCRIPTION OF THE DRAWINGS

The particular features and advantages of the disclosure as well as other objects will become apparent from the following description taken in connection with the accompanying drawings, in which:

FIG. 9A is an explanatory diagram showing an example of a range of color included in the scan image;

FIG. 9B is an explanatory diagram showing another example of the range of color;

FIG. 11A illustrates an example of a tone curve for first luminance correction according to a second modification; and FIG. 11B illustrates another example of a tone curve for first luminance correction according to the second modification.

DETAILED DESCRIPTION

A. Embodiment

A-1. Configuration of Image Processing Apparatus

Figure 1:
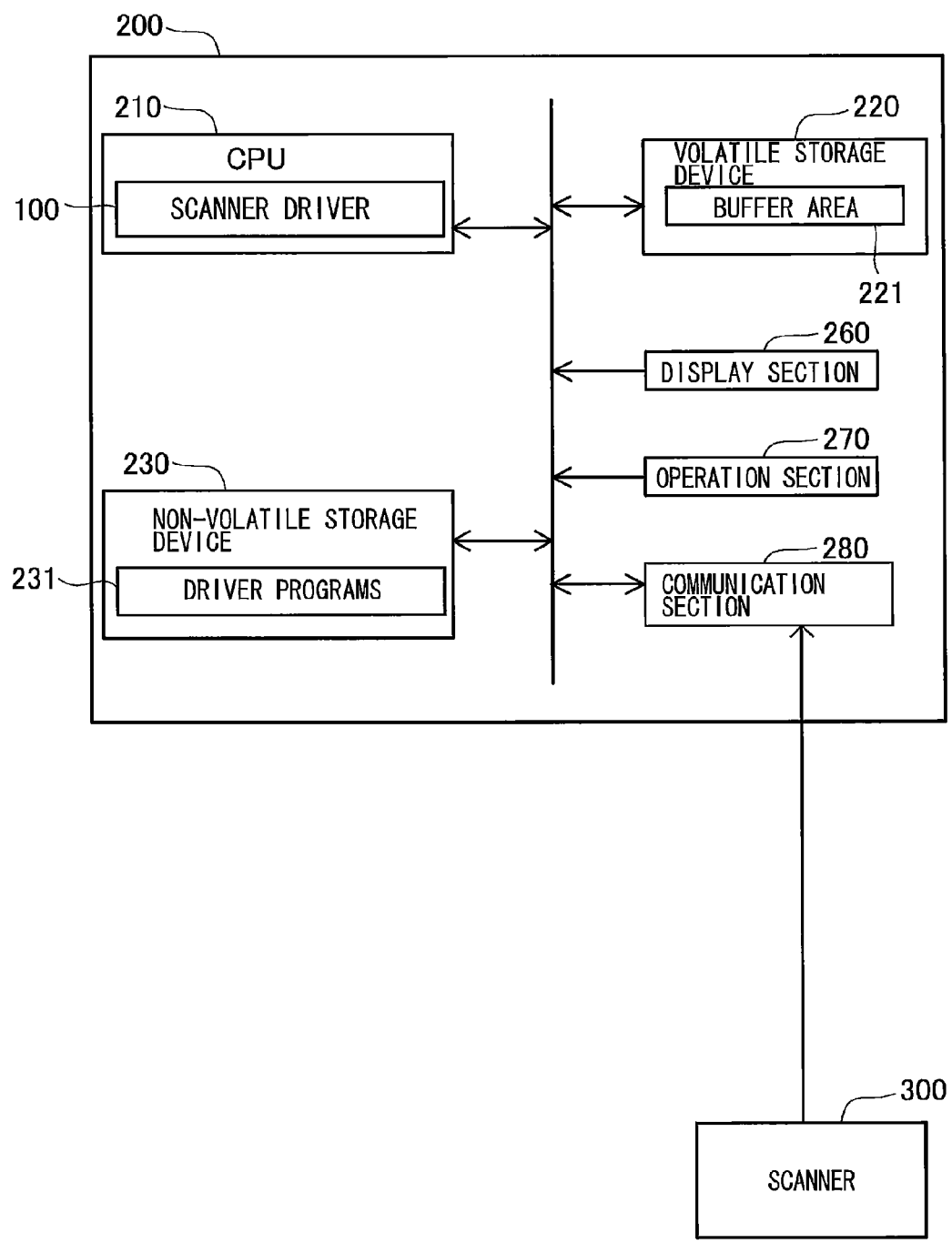
FIG. 1 is a block diagram illustrating a configuration of an image processing apparatus according to an embodiment.

FIG. 1 is a block diagram illustrating a configuration of a computer 200 serving as an image processing apparatus according to an embodiment.

The computer 200 is a personal computer and includes a CPU 210, a volatile storage device 220 including a ROM and a RAM, a non-volatile storage device 230 such as a hard disk drive, a display section 260 such as a liquid crystal display, an operation section 270 such as a mouse or a keyboard, and a communication section 280 for communicating with an external device. The CPU 210 serves as an example of controller.

The computer 200 is connected to an external device, such as a scanner 300, through the communication section 280 so as to communicate with the external device. The scanner 300 is an image reading apparatus configured to optically read a document to acquire scan data.

The volatile storage device 220 includes a buffer area 221 for temporarily storing various intermediate data generated when the CPU 210 perform processing. The non-volatile storage device 230 stores a driver program 231. The driver program 231 may be stored in a CD-ROM or may be downloaded from a server.

The CPU 210 functions as a scanner driver 100 when executing the driver program 231. The scanner driver 100 controls the scanner 300 that is connected to and can be communicate with the computer 200, thereby acquiring scan data from the scanner 300. Further, the scanner driver 100 is configured to execute image processing for the acquired scan data.

A-2. Operation of Computer 200

Scanner Driver 100

Figure 2A:
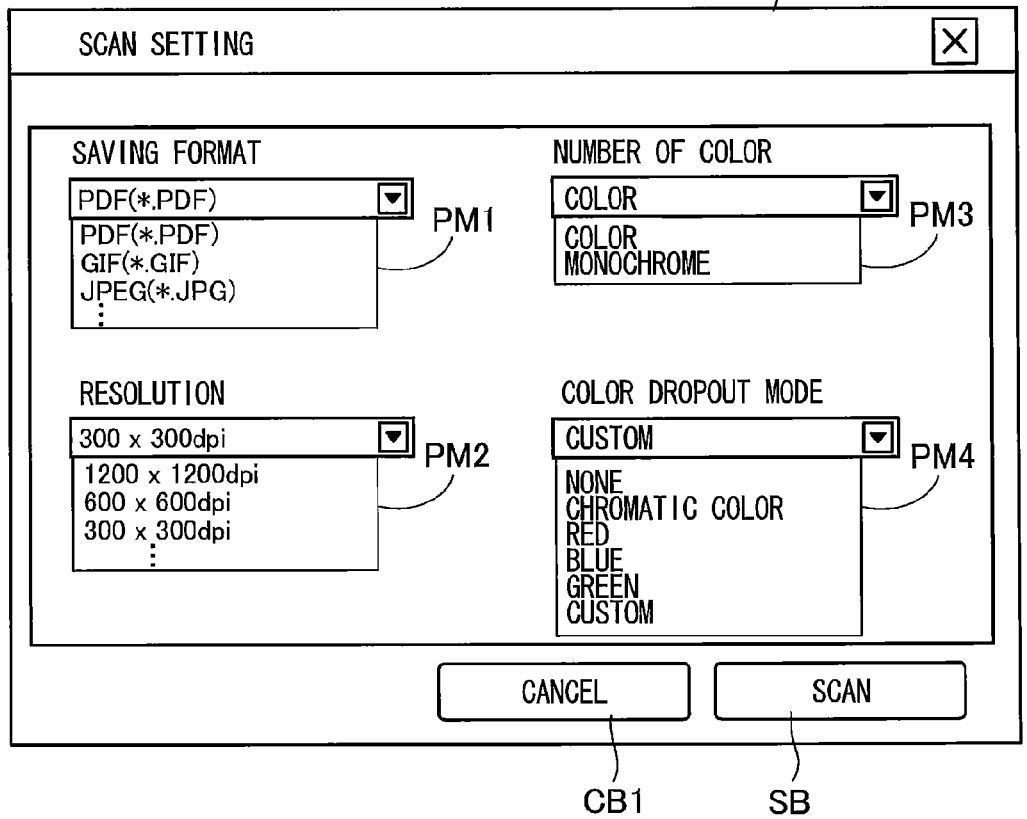
FIG. 2A illustrates an example of a main UI window.
Figure 2B:
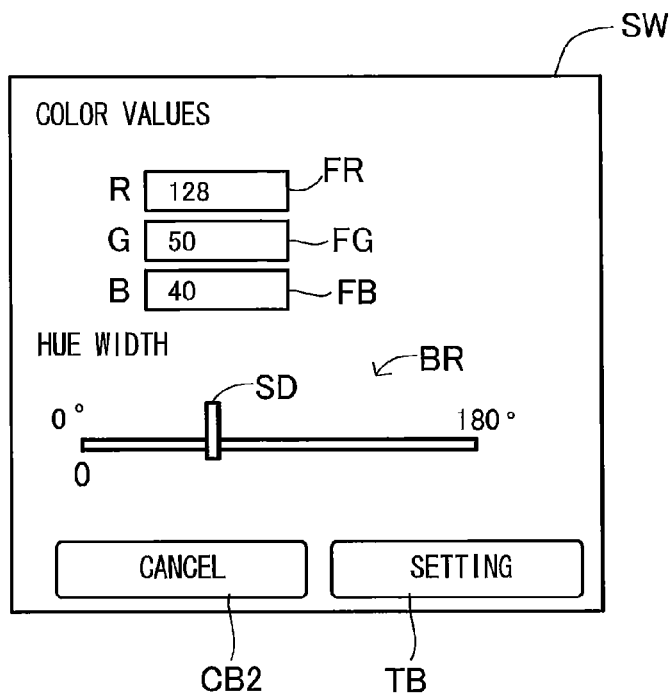
FIG. 2B illustrates an example of a sub UI window.

The CPU 210 (scanner driver 100) of the computer 200 displays a user interface window (hereinafter, referred to as "UI window") on the display section 260 based on an instruction received from a user. FIGS. 2A and 2B are views each illustrating an example of the UI window.

A main UI window MW illustrated in FIG. 2A is a window for receiving, from the user, an instruction for acquiring scan data and an instruction for performing image processing on the scan data. The main UI window MW includes four pull-down menus PM1 to PM4, a cancel button CB1, and a scan button SB.

The pull-down menu PM1 is used for specifying a file format for scan data storage. For example, the pull-down menu PM1 includes a plurality of options including an option indicating "PDF (Portable Document Format)", an option indicating "GIF (Graphics Interchange Format)", and an option indicating "JPEG (Joint Photographic Experts Group)". The main UI window MW allows the user to specify one of these options.

The pull-down menu PM2 is used for setting a resolution (unit is, e.g., dpi (dot per inch)) of scan data to be stored. The pull-down menu PM2 includes a plurality of options indicating a plurality of resolutions. The plurality of resolutions indicated by the plurality of options include, e.g., 300 dpi×300 dpi, 600 dpi×600 dpi, and 1200 dpi×1200 dpi. The main UI window MW allows the user to specify one of these options.

The pull-down menu PM3 is used for color setting of scan data to be stored, that is, used for setting the number of colors of an image represented by the scan data to be stored. The pull-down menu PM3 includes an option indicating "color" and an option indicating "monochrome". When the option indicating "color" is selected, an image represented by scan data stored in scan processing (to be described later) is expressed by a plurality of colors including a chromatic color (e.g., by about 16.70 millions colors (256 gradations for each of RGB color components)). When the option indicating "monochrome" is selected, an image represented by scan data stored in scan processing is expressed by a plurality of colors including only achromatic colors (e.g., by 256 gradations of gray). The user can select one of the options indicating "color" and "monochrome", respectively.

The pull-down menu PM4 is used for making a setting for a color dropout mode. In this embodiment, scan processing to be described later includes two operation modes: a color dropout mode; and a normal mode. The color dropout mode is an operation mode in which the computer 200 performs image processing for deleting a specified color from a scan image that is represented by the scan data.

The pull-down menu PM4 includes six options indicating "none", "chromatic color", "red", "blue", "green", and "custom", respectively. The user can specify one of these options.

The option indicating "none" is an option for not applying the color dropout mode, that is, an option for specifying the normal mode. The option indicating "chromatic color", "red", "blue", or "green" is an option for specifying a chromatic color, a red color, a blue color, or a green color as a specified color of the color dropout mode. Specified color information indicating a specified color (any one of chromatic, red, blue, and green colors) is previously associated with the option indicating "chromatic color", "red", "blue", or "green". The specified color information includes a color value in an RGB color space and a hue width value indicating a width of a hue range. The RGB color space color value is a color value composed of three component values of R, G, and B. Each of the three component values is a gradation value ranging from 0 to 255. The hue width value is represented by an angle ranging from 0° to 180°. The hue width value will be described in detail later.

When the option indicating "custom" is selected, a sub UI window for allowing the user to set the specified color information is displayed on the display section 260. A sub UI window SW of FIG. 2B includes: fields FR, FG, and FB for specifying the color values as the specified color information, i.e., the R, B, and G values, respectively; a slide bar BR for specifying the hue width value as the specified color information; a cancel button CB2; and a setting button TB.

The user can input desired specified information (color value and hue width value), by inputting predetermined values to the fields FR, FG, and FB, on the sub UI window SW to specify the color value, operating a slider SD of the slide bar BR to specify the hue width value, and pressing the setting button TB.

When the main UI window MW of FIG. 2A is displayed on the display section 260, the user can input a scan instruction by pressing the scan button SB in a state where desired options has been selected in the pull-down menus PM1 to PM4.

Figure 3:
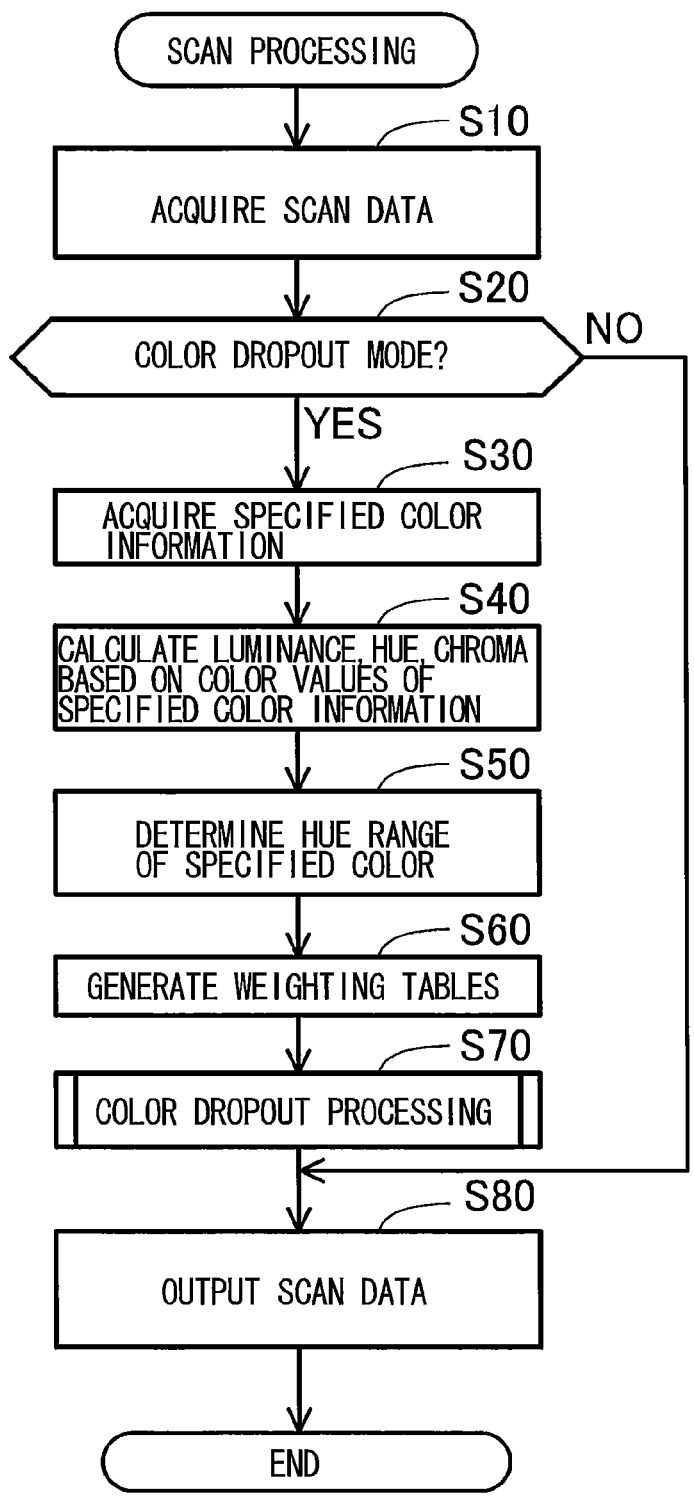
FIG. 3 is a flowchart illustrating steps in a scan processing executed by the image processing apparatus.

Upon receiving the scan instruction from the user, the scanner driver 100 of the computer 200 starts the scan processing. FIG. 3 is a flowchart of the scan processing. In S10, the scanner driver 100 acquires scan data. Specifically, the scanner driver 100 controls the scanner 300 to read a document prepared by the user and generate scan data. The scanner driver 100 acquires the generated scan data from the scanner 300. The scan data is RGB image data including the RGB color space color value (three component values of R, G, and B) for each pixel.

Figure 4A:
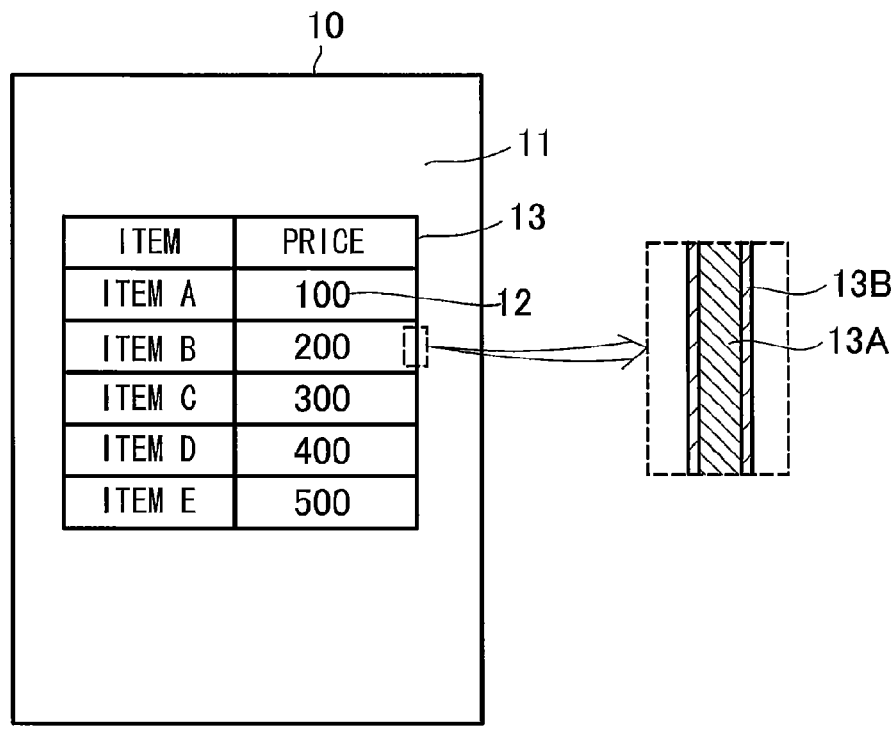
FIG. 4A illustrates an example of a scan image.
Figure 4B:
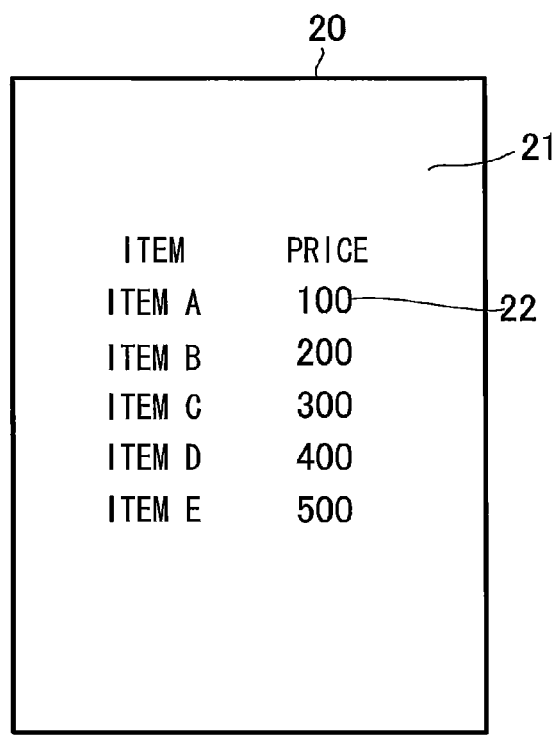
FIG. 4B illustrates an example of a processed scan image based on the scan image of FIG. 4A.

FIGS. 4A and 4B are views each illustrating an example of a scan image. A scan image 10 of FIG. 4A is an example of an image represented by the scan data acquired in S10. The scan image 10 includes a background 11, a frame line 13, and a character 12 disposed inside the frame line 13. Color of the background 11 is not completely white ((R, G, B)=(255, 255, 255)) since the scan image 10 includes reading unevenness, but closes to white. As illustrated in an enlarged view of FIG. 4A, the frame line 13 includes: an edge portion 13B which is a boundary between the frame line 13 and the background 11; and a portion 13A (referred to also as a core portion 13A) other than the edge portion 13B. The edge portion 13B has a "blur" and, therefore, the edge portion 13B and the core portion 13A are different in color. For example, the core portion 13A has a chromatic color, such as blue or green, and the edge portion 13B has color between the color of the core portion 13A and the color of the background 11, such as light blue or light green. The blur of the edge portion 13B can be generated depending on reading characteristics of the scanner 300 or by anti-aliasing applied to the document. The anti-aliasing is processing that smoothly changes the color of a contour portion of an object so as to remove jaggy appearing on the contour portion. In a case where the scan data is once compressed using an irreversible compression scheme, such as JPEG compression, the edge portion 13B may be blurred by this compression processing.

In S20, the scanner driver 100 determines whether the operation mode of the scan processing is the color dropout mode or the normal mode. When the option indicating "none" is selected in the pull-down menu PM4 on the main UI window MW, the scanner driver 100 determines that the operation mode is the normal mode; on the other hand, when an option other than that indicating the "none" is selected, the scanner driver 100 determines that the operation mode is the color dropout mode.

When determining that the operation mode is the color dropout mode (YES in S20), the scanner driver 100 executes a series of processing (S30 to S70) for deleting a specified color from the scan image 10. When determining that the operation mode is the normal mode (NO in S20), the scanner driver 100 skips the series of processing (S30 to S70) and proceeds to S80.

In S30, the scanner driver 100 acquires the specified color information. When any one of options indicating "chromatic color", "red", "blue", and "green" is selected in the pull-down menu PM4 on the main UI window MW, the scanner driver 100 acquires the specified color information associated with the selected option. When the option indicating "custom" is selected in the pull-down menu PM4 on the main UI window MW, the scanner driver 100 acquires the specified color information that the user inputs through the sub UI window SW (FIG. 2B). The color dropout mode is executed so as to delete a specific object in the scan image. Thus, if the frame line 13 in the scan image 10 needs to be deleted from the scan data representing the scan image 10 of FIG. 4A, the user previously inputs, when instructing execution of the scan processing, the specified color information (color value and hue width) indicating a color of the frame line 13 printed on the document through the main UI window MW or sub UI window SW. As a result, in S30, the scanner driver 100 can acquire the specified color information indicating the color of the frame line 13.

The specified color information associated with the option indicating "red" is, e.g., [color value (Ri, Gi, Bi)=(255, 0, 0), hue width value ΔH=40°]. The specified color information associated with the option indicating "blue" is, e.g., [color value (Ri, Gi, Bi)=(0, 0, 255), hue width value ΔH=40°]. The specified color information associated with the option indicating "green" is, e.g., [color value (Ri, Gi, Bi)=(0, 255, 0), hue width value ΔH=40°]. The specified color information associated with the option indicating "chromatic color" is, e.g., [color value (Ri, Gi, Bi)=(255, 0, 0), hue width value ΔH=180°] (color value may indicate any chromatic color).

In S40, the scanner driver 100 calculates a luminance Yi, a hue Hi, and a chroma Ci of the color defined by the color value (Ri, Gi, Bi) acquired as the specified color information. These luminance Yi, hue Hi, and chroma Ci are referred to also as specified luminance Yi, specified hue Hi, and specified chroma Ci, respectively.

Figure 5:
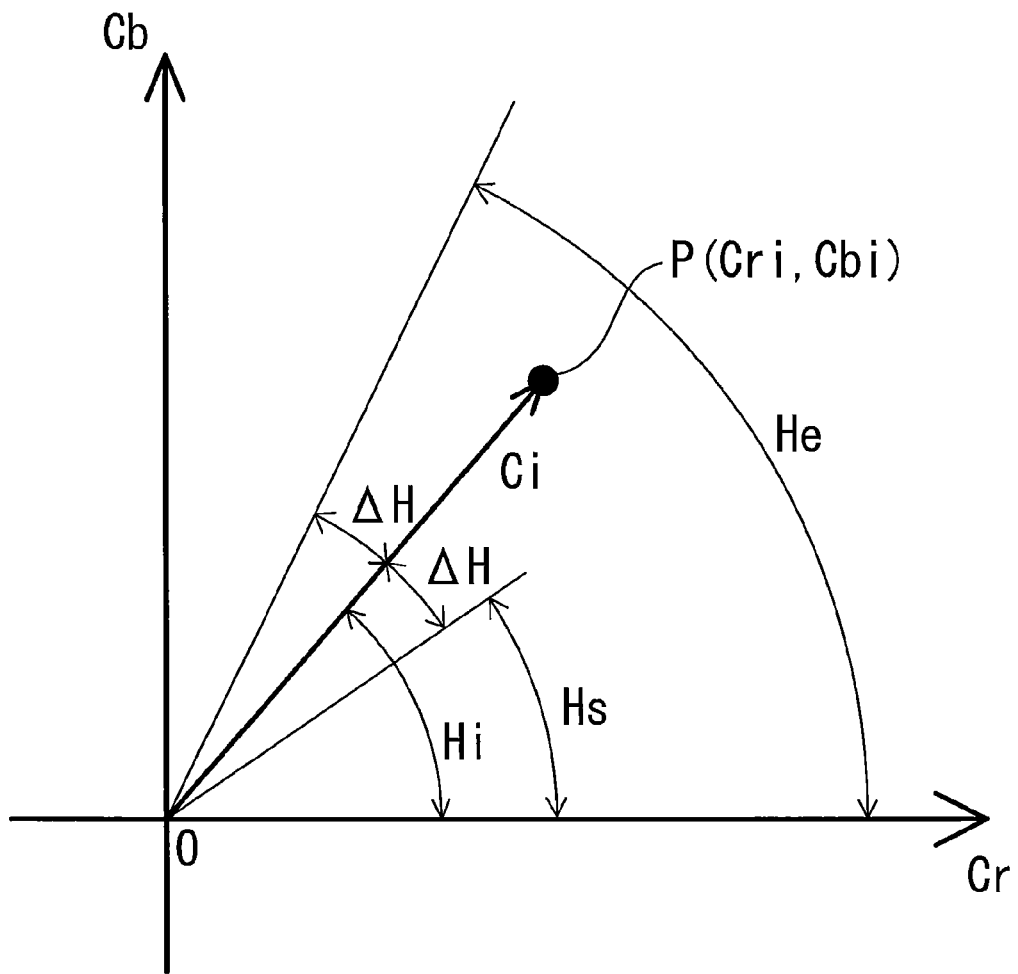
FIG. 5 is an explanatory diagram showing a specified color defined by specified color information.

FIG. 5 is a view explaining the specified color defined by the specified color information. The scanner driver 100 uses a known conversion formula to convert the color value (Ri, Gi, Bi) in the RGB color space into a color value (Yi, Cri, Cbi) in a YCbCr color space. A luminance Yi in the YCbCr color space is used as it is as the specified luminance Yi. Further, the scanner driver 100 uses the component values Cri and Cbi concerning the hue and chroma of the color value in the YCbCr color space to calculate the specified hue Hi and specified chroma Ci.

A point P shown in FIG. 5 is a point obtained by plotting the two component values (Cri, Cbi) in the YCbCr color space in a coordinate system in which horizontal and vertical axes indicate the component Cr and component Cb, respectively. The specified chroma Ci can be represented by a distance between an origin O and the point P. The specified hue Hi can be represented by an angle formed by a line segment connecting the origin and point P and horizontal axis (axis indicating the component Cr). That is, the specified chroma Ci and specified hue Hi are computed using expressions of FIG. 5, respectively. The chroma (specified chroma Ci, etc.) or luminance (specified luminance Yi, etc.) is normalized to a 256-gradation value ranging from 0 to 255.

In S50, the scanner driver 100 calculates and determines a hue range of the specified color (hereinafter, referred to as a "specified-color hue range") defined by the specified color information. That is, a start value Hs (start angle Hs) of the specified-color hue range and an end value He (end angle He) thereof are computed. The specified-color hue range is a range centered at the specified hue Hi calculated in S40 and having a width double (2×ΔH) the hue width value ΔH. In other words, the start value Hs in the specified-color hue range and the end value He therein are determined using expressions of FIG. 5, respectively.

In S60, the scanner driver 100 generates a weighting table for each of the component values of the hue H, chroma C, and luminance Y.

Figure 6A:
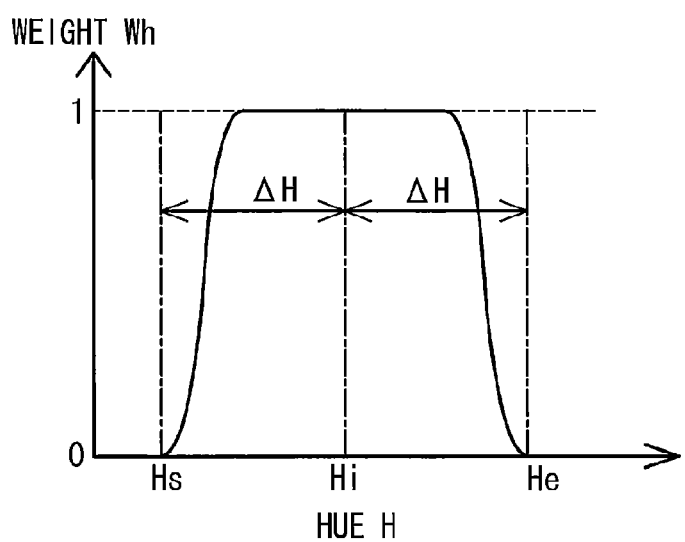
FIG. 6A illustrates an example of a weighting table for hue.
Figure 6B:
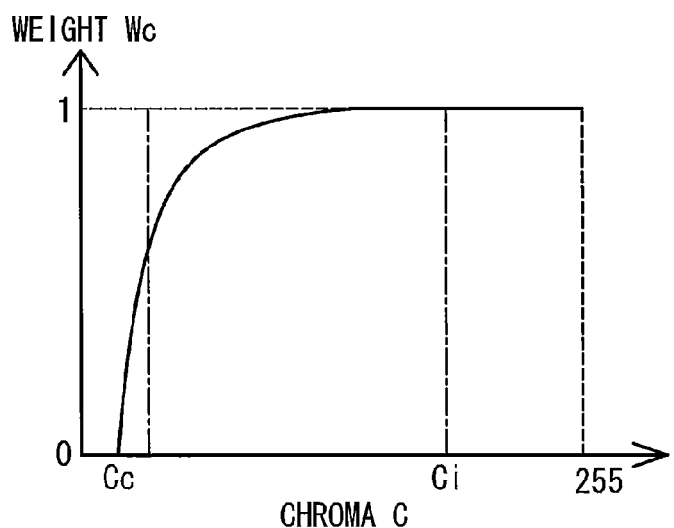
FIG. 6B illustrates an example of a weighting table for chroma.
Figure 6C:
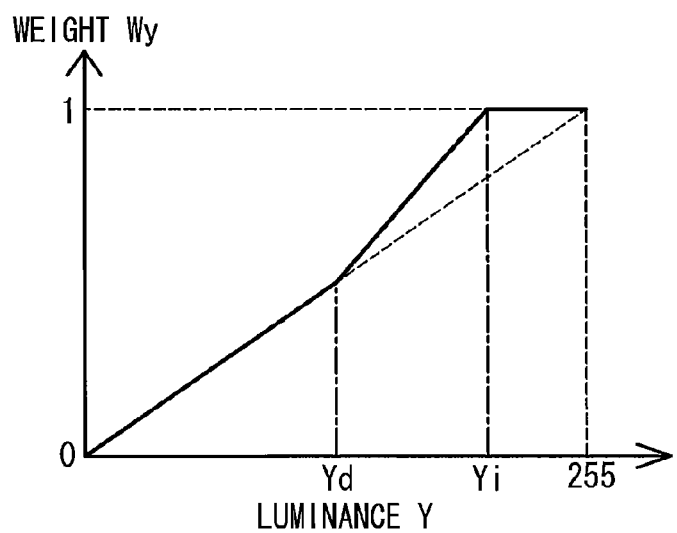
FIG. 6C illustrates an example of a weighting table for luminance.

FIGS. 6A to 6C are views each illustrating an example of the weighting table. A weighting table for the hue H shown in FIG. 6A is a table defining a weight Wh (value ranging from 0 to 1) in accordance with the hue H (value ranging from 0° to 180°). In the weighting table for the hue H, the weights Wh are set to 0 for hues disposed outside the specified-color hue range, i.e., for hues falling within hue ranges of H≤Hs and He≤H. On the other hand, the weights Wh are set to a value other than 0 for hues falling within the specified-color hue range, i.e., for hues falling within a range of Hs<H<He. Specifically, the weight Wh is set to 1 (the maximum value) for hues in the vicinity of a center of the specified-color hue range, i.e., for hues disposed in the vicinity of the specified hue Hi. The weight Wh becomes smaller as the value of the hue H separates from the center of the specified-color hue range, and the weight Wh finally becomes 0 at both ends Hs and He of the specified-color hue range.

A weighting table for the chroma C shown in FIG. 6B is a table defining a weight Wc (value ranging from 0 to 1) in accordance with the chroma C (value ranging from 0 to 255). In the weighting table for the chroma C, the weight Wc is set to 0 for chroma C falling within a range of chroma comparatively close to an achromatic color, i.e., for chroma C lower than a reference value. Specifically, the weight Wc is set to 0 for chroma C falling within a range of 0≤C≤Cc. In this embodiment, the reference value Cc is set to 5. In a range of Cc<C, the weight Wc smoothly increases with an increase in the chroma C. The weight Wc corresponding to each chroma C equal to or higher than the specified chroma Ci is set to 1 (the maximum value).

A weighting table for the luminance Y shown in FIG. 6C is a table defining a weight Wy (value ranging from 0 to 1) in accordance with the luminance Y (value ranging from 0 to 255). In the weighting table for the luminance Y, for a luminance Y falling within a range comparatively low luminance, i.e., for a luminance Y falling in a range of 0≤Y≤Yd, the weight Wy is set to a value represented by an expression: Wy=(Y/255). In this embodiment, the threshold value Yd is determined in accordance with the specified luminance Yi (e.g., Yd=0.75×Yi). However, the threshold value Yd may be a fixed value (e.g., Yd=128). In a range of Yd<Y<Yi, the weight Wy is set so as to linearly increase from (Yd/255) toward 1 as the luminance Y increases. In a range of Yi≤Y≤255, the weight Wy is set to 1.

Figure 7:
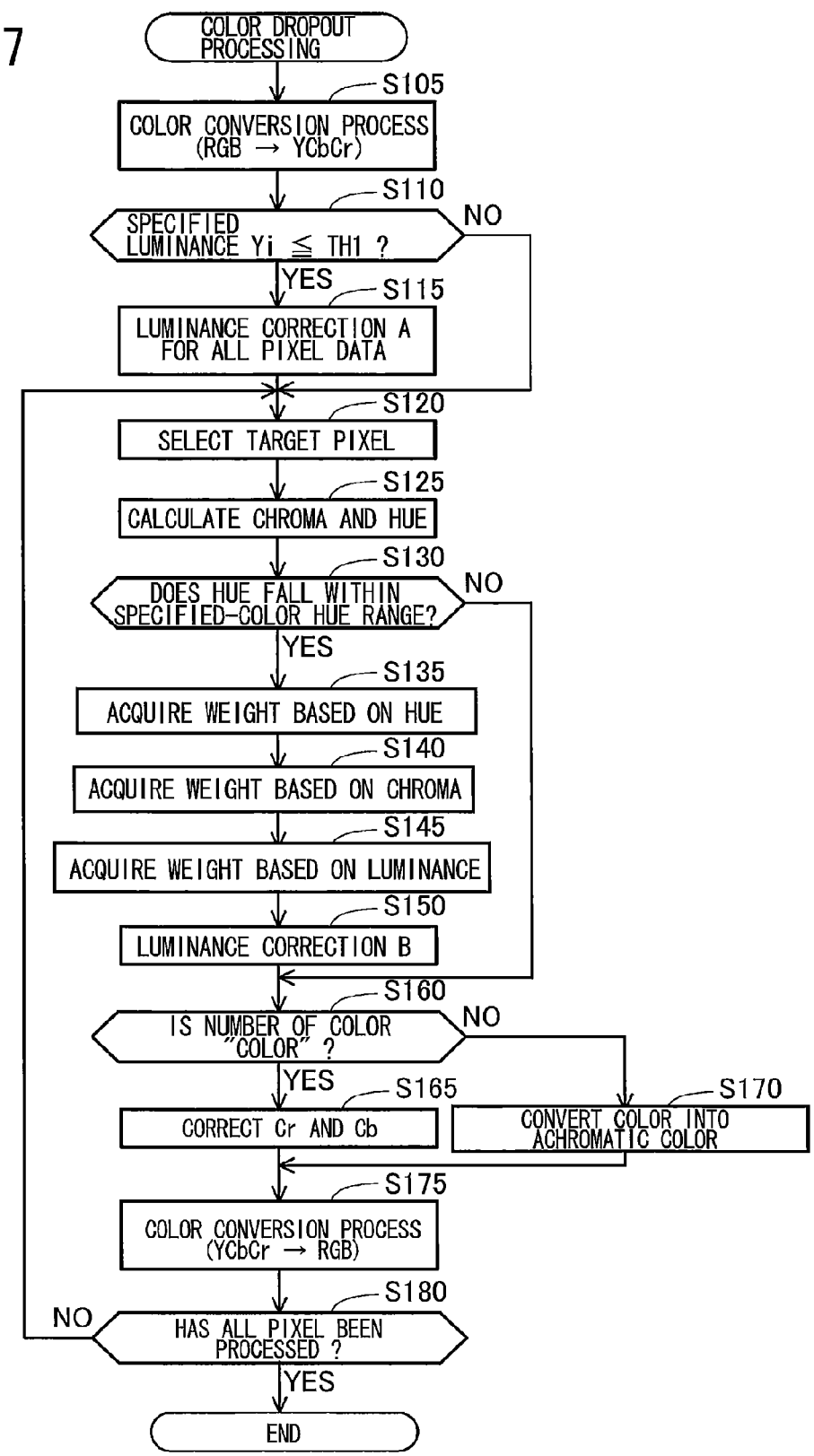
FIG. 7 is a flowchart illustrating steps in a color dropout processing included in the scan processing of FIG. 3.

In S70, the scanner driver 100 executes a dropout processing. FIG. 7 is a flowchart of the dropout processing.

In S105 of FIG. 7, the scanner driver 100 executes color conversion processing. Specifically, the scanner driver 100 converts each pixel value of the scan data acquired in S10 of FIG. 3 from a color value defined in the RGB color space into that a color value defined in the YCbCr color space.

In S110, the scanner driver 100 determines whether or not the specified luminance Yi is equal to or lower than a predetermined threshold value TH1. In this embodiment, the threshold value TH1 is 240.

When the specified luminance Yi is equal to or lower than the TH1 (YES in S110), the scanner driver 100 executes luminance correction A for the scan data (S115). When the specified luminance Yi exceeds the TH1 (NO in S110), the scanner driver 100 skips S115. That is, the scanner driver 100 does not execute the luminance correction A for the scan data.

Figure 8A:
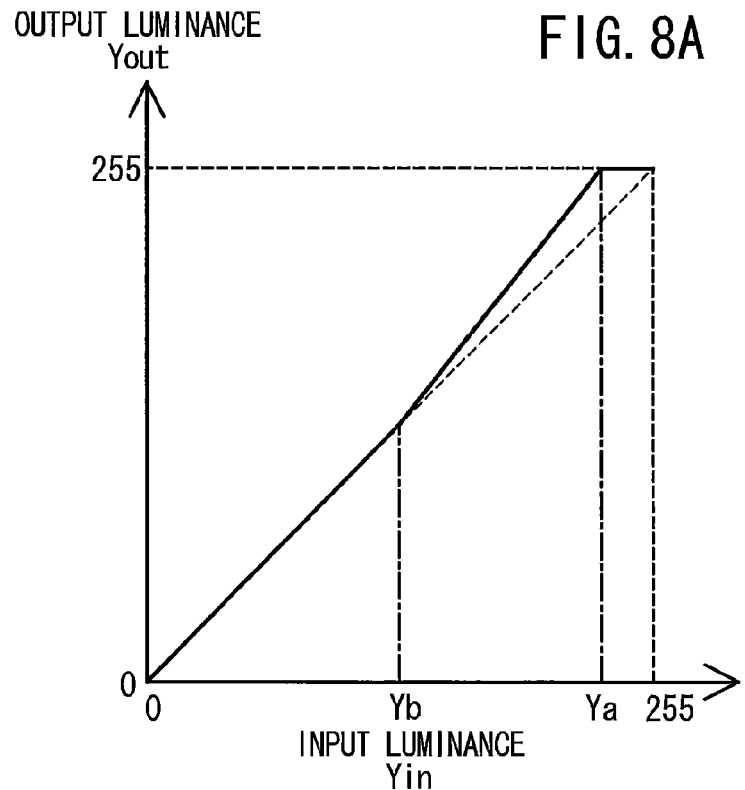
FIG. 8A illustrates an example of a tone curve for first luminance correction.
Figure 8B:
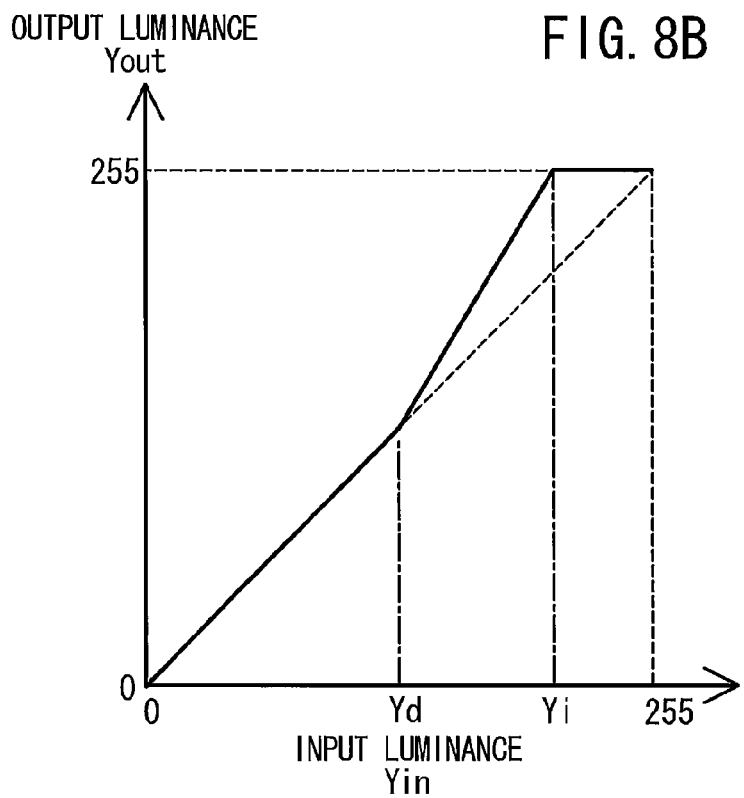
FIG. 8B illustrates an example of a tone curve for second luminance correction.

FIGS. 8A and 8B are views each illustrating an example of a tone curve. FIG. 8A illustrates an example of a tone curve for the luminance correction A. The luminance correction A is executed for all the pixels constituting the scan image 10 set as target pixels. As a result, the luminance correction A can be easily executed. Specifically, the scanner driver 100 corrects the luminance Y of all the pixels constituting the scan image 10 according to a correction table (one-dimensional lookup table (not illustrated)) in which an input luminance Yin and an output luminance Yout are associated with each other so as to realize the tone curve of FIG. 8A. However, as described later, there may be cases where the luminance Y is changed by the correction and where the luminance Y is not changed in spite of application of the correction, depending on values of the luminance Y. In S110, components other than the luminance Y, i.e., chroma C and hue H are not corrected.

As can be seen from the tone curve of FIG. 8A, a luminance Y of a pixel is not changed through the luminance correction A if the luminance Y falls within a range of 0≤Y<Yb. If a luminance Y of a pixel falls within a range of Ya≤Y<255, the luminance Y is changed to 255. If a luminance Y of a pixel is 255, the luminance Y is maintained at 255. If a luminance Y of a pixel falls within a range of Yb≤Y<Ya, the luminance Y is corrected such that a change in the output luminance Yout with respect to a change in the input luminance Yin is continuous over the inside and outside of the range of the range of Yb≤Y<Ya. More specifically, when the luminance Y falls within the range of Yb≤Y<Ya, the luminance Y is corrected such that the output luminance Yout continuously approaches to the maximum value "255" and gradually increases as the input luminance Yin increases. Correcting the luminance Y in the range of Yb≤Y<Ya in this manner can prevent abrupt color change from appearing in the processed scan image.

In this embodiment, the threshold values Ya and Yb are fixed values are 240 and 128, respectively.

In S120, the scanner driver 100 selects one target pixel from among the plurality of pixels constituting the scan image 10. In S125, the scanner driver 100 calculates a chroma Ct and a hue Ht of the target pixel from a value (YCbCr value) of the target pixel.

In S130, the scanner driver 100 determines whether or not the hue Ht of the target pixel falls within the specified-color hue range, i.e., within the range of Hs<H<He. When the hue Ht of the target pixel falls within the specified-color hue range (YES in S130), the scanner driver 100 executes processing of S135 to S155 to execute luminance correction B for the target pixel. If the hue Ht of the target pixel falls outside the specified-color hue range (NO in S130), the seamier driver 100 skips processing of S135 to S155. That is, when the hue Ht of the target pixel falls outside the specified-color hue range (NO in S130), the scanner driver 100 does not execute the luminance correction B for the target pixel.

In S135, the scanner driver 100 acquires the weight Wh according to the hue Ht of the target pixel. Specifically, the scanner driver 100 acquires the weight Wh by referring to the weighting table for the hue H shown in FIG. 6A that is generated in S60 of FIG. 3.

In S140, the scanner driver 100 acquires the weight Wc according to the chroma Ct of the target pixel. Specifically, the scanner driver 100 acquires the weight Wc by referring to the weighting table for the chroma C shown in FIG. 6B that is generated in S60 of FIG. 3.

In S145, the scanner driver 100 acquires the weight Wy according to the luminance Yt of the target pixel. Specifically, the scanner driver 100 acquires the weight Wy by referring to the weighting table for the luminance Y shown in FIG. 6C that is generated in S60 of FIG. 3.

In S150, the scanner driver 100 executes the luminance correction B for the target pixel. If the luminance correction A has been executed in S115, the luminance of the target pixel that has been corrected through the luminance correction A is further corrected in S150. A luminance Yta of the target pixel after execution of the luminance correction B is calculated according to the following expression (1) using the luminance Yt before execution of the luminance correction B and weights Wh, Wc, and Wy acquired in S135 to S145.

$$Yta = (Wh \times Wc) \times Wy \times 255 + (1 - Wh \times Wc) \times Yt \quad (1)$$

The (Wy×255) included in the first term of the expression (1) is equal to the output luminance Yout that is obtained by performing the correction using the tone curve of FIG. 8B. The luminance Yt included in the second term of the expression (1) is equal to the input luminance Yin that is used when the correction is performed using the tone curve of FIG. 8B. Thus, the (Wh×Wc) is a value ranging from 0 to 1. Therefore, the (Wh×Wc) can be considered as a parameter indicating a degree of the correction (a correction level). That is, the expression (1) can be said to be an expression that changes the correction level of correction performed using the tone curve of FIG. 8B by the parameter (Wh×Wc).

For example, if both the weight Wh of the hue H and weight Wc of the chroma C are the maximum value "1", (Wh×Wc)=1 is established, so that Yta=Wy×255 is established according to the expression (1). In this case, the correction level is maximum. In other words, the correction using the tone curve of FIG. 8B is completely performed.

On the other hand, if at least one of the weight Wh of the hue H and weight Wc of the chroma C is the minimum value "0", (Wh×Wc)=0 is established, so that Yta=Yt is established according to the expression (1). In this case, the correction level is maximum. In other words, the correction using the tone curve of FIG. 8B is not performed at all.

The luminance Y of the color specified by the specified color information is changed to the maximum value "255" by the luminance correction B.

In S160, the scanner driver 100 determines whether or not the setting of the number of colors is "color". The determination of S160 is made based on the option ("color" or "monochrome") selected in the pull-down menu PM3 on the main UI window MW of FIG. 2A. When the setting of the number of colors is "color" (YES in S160), the scanner driver 100 corrects the Cr value and Cb value of the target pixel (S165). Specifically, the scanner driver 100 changes the Cr value and Cb value of the target pixel to "0" if the post-correction luminance Yta of the target pixel is the maximum value "255". As a result, if the post-correction luminance Yta of the target pixel is the maximum value "255", the color of the target pixel after correction is changed to the same color as the background, i.e., white. The luminance Y of the color specified by the specified color information has been changed to the maximum value "255" through the luminance correction B, so that the scanner driver 100 changes the corrected color of the target pixel to white in S165. In other words, an object of the color specified by the specified color information is deleted from the scan image 10. When the post-correction luminance Yta of the target pixel is a value other than the maximum value "255", the scanner driver 100 does not change the Cr value and Cb value of the target pixels.

When the setting of the number of colors is "monochrome" (NO in S160), the scanner driver 100 converts the color of the target pixel into an achromatic color. That is, the scanner driver 100 changes the Cr value and Cb value of the target pixel to 0 unconditionally (S170).

In S175, the scanner driver 100 converts the color value of the target pixel (luminance Yta, Cr value, and Cb value that has been corrected) defined in the YCbCr color space value into the color value defined in the RGB color space. In S180, the scanner driver 100 determines whether all the pixels of the scan image 10 have been processed as the target pixels. When there is any unprocessed pixel (NO in S180), the scanner driver 100 returns to S120, selects the unprocessed pixel as a new target pixel, and repeats the above-described processing of S125 to S175. When processing for all the pixels is completed (YES in S180), the scanner driver 100 ends the dropout processing.

FIG. 4B illustrates a processed scan image 20 represented by scan data on which the dropout processing has been executed. The frame line 13 (FIG. 4A) which is an object having a specified color is deleted from the scan image 20 of FIG. 4B. That is, the scan image 20 includes the background 21 and the character 22 but does not include the frame line. When performing automatic character recognition, as compared to the scan image 10 in which the frame line is included, the scan image 20 from which the frame line is deleted can obtain improvement in recognition accuracy of characters in the scan image.

After the dropout processing, the scanner driver 100 outputs the scan data in S80 of FIG. 3. For example, in the dropout mode, the scanner driver 100 outputs an image file that is obtained by storing, in a predetermined format, the processed scan data on which the dropout processing has been executed. On the other hand, in the normal mode, the scanner driver 100 outputs an image file that is obtained by storing the scan data acquired in S10 in a predetermined format. The output of the scan data corresponds to storage of the scan data in the non-volatile storage device 230 in the present embodiment. The output of the scan data may be realized as transmission of the scan data to another device or printing of an image represented by the scan data.

According to the embodiment described above, the scanner driver 100 executes, on a plurality of pixels constituting the scan image 10, a first correction (specifically, the luminance correction A shown in FIG. 8A) that increases brightness of the color (specifically, color having a luminance Y in the range of Yb≤Y<255) within a specified range (S115 of FIG. 7). Further, the scanner driver 100 executes a second or third correction (specifically, the luminance correction B shown in FIG. 8B and correction of the Cr value and Cb value after the luminance correction B) that applies correction to the specified color (specifically, color within the specified-color hue range) to change the specified color to color (specifically, white) brighter than that before correction (S135 to S170 of FIG. 7). As a result, the specified color included in the scan image 10 is corrected to a specific color by the second or third correction, and the brightness of the color within a specific range in the scan image 10 is increased by the first correction. This can prevent an edge (specifically, the edge portion 13B) of an object (specifically, the frame line 13) of the specified color from remaining in the processed scan image 20. A more detailed description will be made below.

FIGS. 9A and 9B are views each explaining effects of the embodiment. FIG. 9A illustrates a range (color gamut) CS of the color that can be included in the scan image in a graph having a vertical axis indicating the luminance Y and a horizontal axis indicating the chroma C. More specifically, FIGS. 9A and 9B illustrate a part of the color range CS in which the luminance is near the maximum value "255". As described above, the frame line 13 which is the object to be deleted in the scan image 10 includes the core portion 13A and the edge portion 13B (FIG. 4A). In FIG. 9A, an area A1 to which the color of the core portion 13A mainly belongs and an area A2 to which the color of the edge portion 13B mainly belongs are plotted. As can be seen from FIG. 9A, the colors in the edge portion 13B are distributed between the color (white, i.e., color having a luminance of the maximum value "255" and a chroma of 0) of the core portion 13A and color of the background 11. As described above, there may be a case where the color of the frame line 13 ranges over a comparatively wide range from the area A1 to area A2. The area A2 has a higher brightness and a lower chroma than the area A1. Further, although not shown in FIG. 9A, the area A2 can spread over a comparatively wide hue range.

In such a case, it is assumed that a color P1 within the area A1 is specified by the color value of the specified color information. The color P1 is assumed to be a color with a luminance of Yi1, a hue of Hi1, and a chroma of Ci1. In this case, even if the color within the area A1 can be deleted by the above-described second or third correction, the color of the area A2 is highly likely to remain in the processed scan image 20. That is, the edge portion 13B is highly likely to remain in the processed scan image 20. According to the embodiment, the color in the area A2 can be appropriately deleted by the first correction. This is because the first correction brings a color having a comparatively high luminance close to white regardless of the hue and chroma values.

The color in the area A2 may be brought close to white by widening a range over which the color is changed by the second or third correction. For example, the hue width value ΔH (FIG. 6A) may be excessively increased, or reference value Cc (FIG. 6C) for the chroma may be excessively reduced. In this case, however, a color having an excessively low chroma or a color excessively different in hue from the color P1 may be disadvantageously brought close to white if the color has a luminance in the vicinity of the area A1. As a result, an object (in the example of FIG. 4A, character 12) that is not a target of deletion may be more likely to be deleted, or the color of the object that is not the deletion target may be more likely to be changed. In the embodiment, such a disadvantage can be avoided.

Further, in the first correction (luminance correction A) of the embodiment shown in FIG. 8A, the brightness of a color within a specific range that has a brightness higher than the threshold value Ya (that is, a color having a luminance Y shown in Ya≤Y<255) is corrected to the maximum value "255". Thus, a color having a comparatively high luminance is changed to white regardless of the hue and chroma values. As a result, when the specified color is changed to a specific color (specifically, white), the edge portion 13B can be appropriately prevented from remaining in the processed scan image 20.

Further, in the first correction of the embodiment, the brightness of a color falling within a specific range and having a brightness lower than the threshold value Ya (that is, a color having a luminance Y in a range of Yb≤Y<Ya) is corrected such that the output luminance Yout continuously approaches to the maximum value "255" as the input luminance Yin increases (FIG. 8A). This can prevent abrupt color change from appearing in the processed scan image 20.

Further, in the first correction of the embodiment, as can be seen from the tone curve of FIG. 8A, a color within a specific range (a color having a luminance Y in a range of Yb≤Y<255) is changed to a color brighter than that before correction, and a color darker than the colors within the specific range (that is, a color having a luminance Y in a range of 0≤Y<Yb) is not changed. As a result, the processed scan image 20 can be prevented from being excessively bright.

Further, the specified color information includes the color value (Ri, Gi, Bi) in a specific color space (specifically, RGB color space) and the hue width value ΔH indicating the width of the hue range. The second or third correction is executed using the color value (Ri, Gi, Bi) and hue width value ΔH. Specifically, the color value (Ri, Gi, Bi) and hue width value ΔH are used to generate the weighting tables (S60 in FIG. 3, FIGS. 6A to 6C), and the luminance correction B which is part of the second or third correction is executed according to the weighting tables (S135 to S150 of FIG. 7). As a result, a color specified by the user, i.e., a color specified by both the color value (Ri, Gi, Bi) and the hue width value ΔH can be appropriately corrected through the second or third correction.

Further, in the second or third correction, as can be seen from the weighting table for the hue H shown in FIG. 6A, colors based on the color value (Ri, Gi, Bi) are corrected so as to be brought close to a specific color (specifically, white which is a color having the maximum brightness). In other words, the weighting tables are used to correct, to the specific color, colors falling within a hue range that is centered at the specified hue Hi and that has a width (specifically, 2×ΔH) represented by the hue width value ΔH. As a result, a color within an appropriate range can be set as a target of the second or third correction. Thus, an object to be deleted can be appropriately deleted from the scan image. Further, an object that is not a target of deletion can be prevented from erroneously being deleted from the scan image.

Further, as can be seen from the weighting table for the hue H shown in FIG. 6A, the second or third correction is executed using a correction amount that is reduced continuously or gradually in the above-described hue range as the value of the hue H separates from the center of the hue (specified hue Hi). As a result, abrupt color change can be prevented from appearing in the processed scan image 20.

Further, as can be seen from the weighting table for the chroma C shown in FIG. 6B, a color having a chroma C lower than the chroma reference value Cc is not changed in the second or third correction. The color having a lower chroma, i.e., a color comparatively close to an achromatic color can appear in various objects. If such a color is deleted, the color of an object that should not be changed in the scan image 10 is likely to be changed. In the embodiment, the color of the object that should not be changed in the scan image 10 can be prevented from being changed.

Further, in the above embodiment, if the color (Ri, Gi, Bi) specified by the color value of the specified color information falls within a predetermined range (specifically, if the specified color has a luminance Y equal to or lower than the threshold value TH1) (YES in S110 of FIG. 7), the first correction is executed (S115), and then the second or third correction is executed (S135 to S170). On the other hand, if the color (Ri, Gi, Bi) specified by the color value of the specified color information is outside the predetermined range (specifically, if the specified color has a luminance Y exceeding the threshold value TH1) (NO in S110 of FIG. 7), the first correction is not executed, and only the second or third correction is executed (S135 to S170). As a result, the scan image 10 can be appropriately corrected depending on the color specified by the specified color information.

A more detailed description will be made below. FIGS. 9A and 9B each illustrate a part of a range (color gamut) CS of the color that can be included in the scan image, in which the luminance is near the maximum value "255". In the above-described example of FIG. 9A, the color of the core portion 13A in the frame line 13 has a luminance Y equal to or lower than the threshold value TH1. As described above, in the example of FIG. 9A, the color P1 (Yi1, Hi1, Ci1) falling within the area A1 is specified (Yi≤TH1) in order to delete the frame line 13. In this case, the area A2 to which the color of the edge portion 13B mainly belongs spreads up to an area having a comparatively low luminance. Accordingly, if the color of the edge portion 13B cannot be deleted and remains, the edge portion remaining in the processed scan image 20 is noticeable. Therefore, in the case of FIG. 9A, there is a comparatively major advantage in executing the first correction so as to prevent the edge portion from remaining in the scan image 20.

Unlike the example of FIG. 9A, an example of FIG. 9B is an example in which the color of the core portion 13A of the frame line 13 has a luminance Y exceeding the threshold value TH1. In FIG. 9B, an area A3 to which the color of the core portion 13A mainly belongs and an area A4 to which the color of the edge portion 13B mainly belongs are plotted. In this example, in order to delete the frame line 13, a color P2 falling within the area A3 is specified by the color value of the specified color information. The color P2 is assumed to be a color with a luminance of Yi2, a hue of Hi2, and a chroma of Ci2 (Yi2>TH1). In this example, the color of the core portion 13A has a comparatively high luminance (i.e., close to the background color). Accordingly, the areas A3 and A4 in which the color of the frame line 13 including the core portion 13A and the edge portion 13B is distributed do not spread as much as the areas A1 and A2 in the example of FIG. 9A. Thus, the edge portion 13B is highly likely to be deleted only by performing the second or third correction even if the first correction is not performed. Further, even if the edge portion 13B cannot be sufficiently deleted in spite of application of the second or third correction and thus remains in the processed scan image 20, the edge portion 13B has a color (color belonging to the area A4) with a higher luminance than in the case of the FIG. 9A. Accordingly, the remaining edge portion 13B is comparatively less noticeable. Therefore, there is a comparatively minor advantage in executing the first correction. On the contrary, a disadvantage generated due to execution of the first correction, in that an object that is not a deletion target is deleted or the color of an object that is not a deletion target, is changed may exceed the advantage.

As described above, in the above embodiment, the scanner driver 100 determines whether or not the first correction is executed depending on whether or not the luminance Yi of the color (Ri, Gi, Bi) specified by the color value of the specified color information is equal to or lower than the threshold value TH1. Accordingly, the scan image 10 can be appropriately corrected to suit the color specified by the specified color information.

B. Modifications (1) In the above embodiment, as illustrated in FIG. 8A and the like, the first correction (i.e., luminance correction A) corrects the color having a luminance in the range of Yb≤Y<255 such that brightness of the color is increased regardless of the hue H and chroma C. Alternatively, the scanner driver 100 may determine a change range of color based on at least one of the hue H and chroma C before the first correction. In this case, the first correction is executed such that only the color within the change range is changed according to the tone curve of FIG. 8A and that the color outside the change range is not changed.

Figure 10:
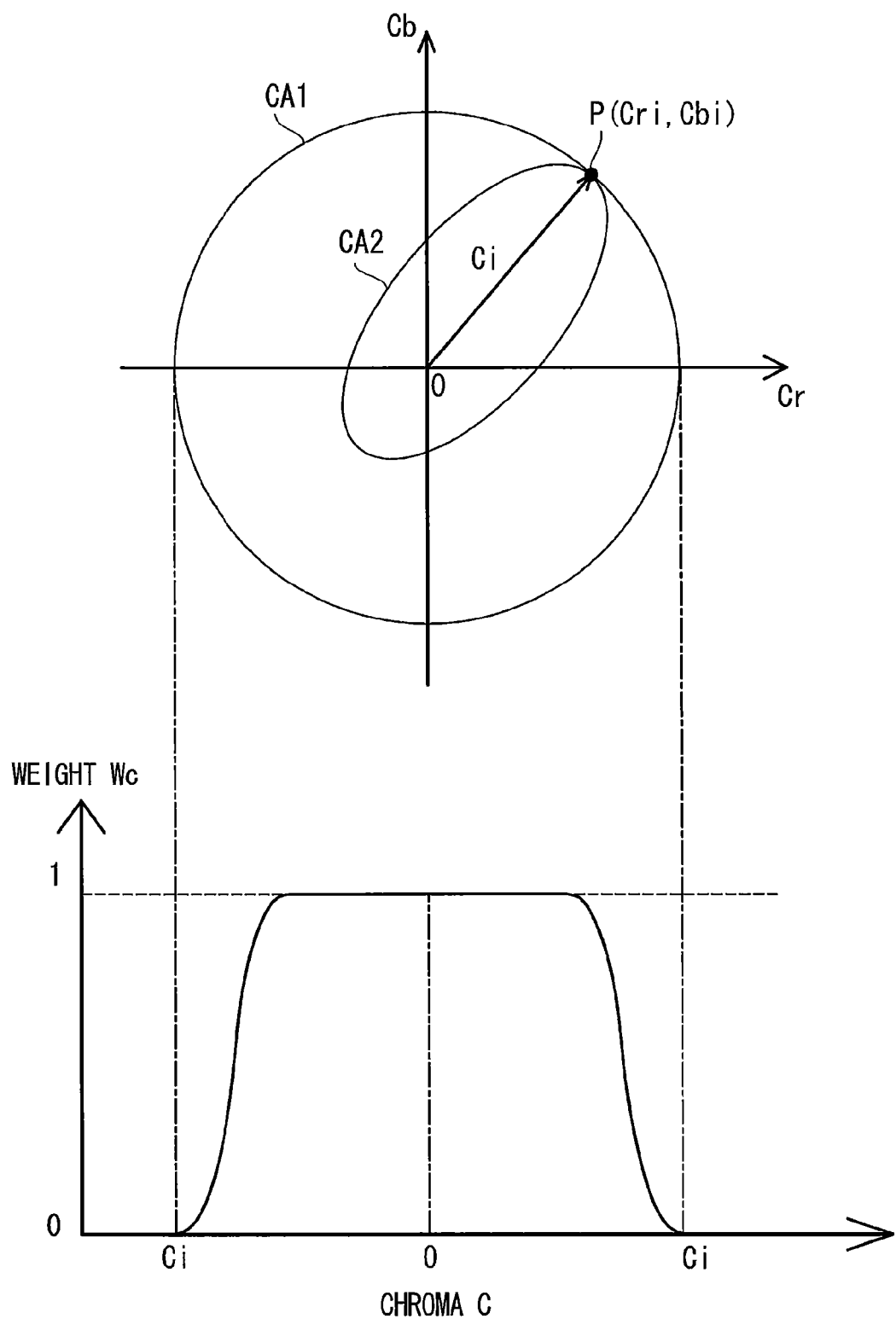
FIG. 10 is an explanatory diagram illustrating an example of a change range defined in a coordinate system and an example of a weighting table for chroma.

FIG. 10 is an explanatory view of the modification (1). An upper portion of FIG. 10 illustrates an example of the change range in a coordinate system having a horizontal axis indicating the component Cr and a vertical axis indicating the component Cb. In the upper portion of FIG. 10, a point P is a point defined by a value Cri of the Cr component and a value Cbi of the Cb component of the color represented by the color value (Ri, Gi, Bi) of the specified color information. A change range CA1 shown in the upper portion of FIG. 10 is a range of color within which the chroma C is lower than the specific chroma Ci. As described above, the specific chroma Ci is the chroma of the color identified by the color value (Ri, Gi, Bi) acquired as the specified color information. Thus, the change range of color is preferably determined based on the specified color information. This can prevent the color of a part of the scan image 10 that should not be changed from being changed by the correction. Specifically, in an example of FIG. 4A, the edge portion 13B in the scan image 10 has colors closer to the background color (white) than the color of the core portion 13A is. That is, the colors in the edge portion 13B have a lower chroma C than chroma C of the color of the core portion 13A. Thus, change of the color by the first correction for reliably deleting the edge portion 13B from the scan image 10 may be applied to a color falling within the change range CA1 (a color having a chroma lower than the specified chroma Ci), and need not be applied to a color outside the change range CA1. In the modification (1), unnecessary color change is appropriately prevented. In other words, the color of a part of the scan image 10 that should not be changed is prevented from being changed by the correction.

Preferably, in the modification (1), a weight Wc2 changing according to the chroma C shown in a lower portion of FIG. 10 is used to adjust a correction amount of the first correction. The weight Wc2 assumes a maximum value "1" for the chroma C near "0", continuously decreases as the chroma C increases, and assumes a minimum value "0" for the chroma C equal to or higher than the specified chroma C. With this configuration, abrupt color change can be prevented from appearing in the processed scan image 20.

A change range CA2 of color shown in the upper portion of FIG. 10 may be adopted in place of the change range CA1. On the coordinate system shown in the upper portion of FIG. 10, the change range CA2 is set as a range within an ellipse having one end and another end in a longitudinal direction. The one end of the ellipse in the longitudinal direction contacts the point P and the other end of the ellipse in the longitudinal direction is positioned near an origin (at which the chroma C is 0) of the coordinate system. Each color of the edge portion 13B in the scan image 10 is a color between the color (considered to be a color indicated by the point P) of the core portion 13A and the background color (white: color having a chroma C of 0). Thus, the colors of the edge portion 13B are highly likely to be positioned within the change range CA2.

(2) In the above-described embodiment, the threshold values Ya and Yb of the tone curve of FIG. 8A for the first correction are fixed values. However, the threshold values Ya and Yb may be dynamically determined based on the specified color information.

FIGS. 11A and 11B are views each illustrating an example of a tone curve used in the first correction according to the modification (2). The tone curve of FIG. 11A shows a case where the specified luminance Yi assumes a comparatively large value and Ya=Ya1, Yb=Yb1 are established. The tone curve of FIG. 11B shows a case where the specified luminance Yi assumes a comparatively small value and Ya=Ya2, Yb=Yb2 are established (Ya2<Ya1, Yb2<Yb1).

More specifically, the threshold values Ya and Yb may be determined based on the luminance of the color represented by the color value (Ri, Gi, Bi) of the specified color information, i.e., according to the following expressions (2) using the specified luminance Yi.

$Ya=240$ (if $Yi \geq 240$ is established)

$Ya=240-\{0.2 \times (240-Yi)\}$ (if $Yi<240$ is established)

$Yb=0.75 \times Yi$

In general, it is preferable that the darker the color specified by the specified color information is, the smaller the threshold value Ya becomes. This is because the darker the color specified by the specified color information is, the more likely the edge portion 13B is to be dark. Accordingly, reducing the threshold value Ya if the specified color is dark can more reliably delete the edge portion 13B. That is, appropriate execution of the first correction based on the color specified by the specified color information can more appropriately prevent the edge of an object having a specified color from remaining in the scan image.

(3) In the above-described embodiment and modifications, the first correction is executed for the luminance Y in the YCbCr color space. Alternatively, the first correction may be executed for, e.g., a luminance (L* value) of a CIELab color space or a brightness (V value) of an HSV color space. In general, it is preferable that the first correction is executed for the color value identified in a specific color space including a component indicating one of the brightness value and luminance. This allows the first correction that increases brightness value or luminance of a color in a specific range to be appropriately executed.

(4) In the above-described embodiment, the first correction (luminance correction A) is correction that increases the brightness of a color having a luminance Y in the range of Yb≤Y<255 (FIG. 8A). On the other hand, in the modification (1), the first correction (luminance correction A) is correction that increases the brightness of a color having a luminance Y in the range of Yb≤Y<255 and a chroma C within the change range CA1 (FIG. 10A). More generally, the first correction is preferably executed for a color in a specific range including a specific achromatic color brighter than the color specified by the specified color information. This is because the color of the edge portion 13B to be deleted from the scan image 10 through the first correction is highly likely to be a color between the color (equal to the color specified by the specific color information) of the core portion 13A and background color (generally, white which is an achromatic color). Thus, the color of the edge portion 13B is highly likely to be brighter than the color specified by the specified color information and comparatively close to the achromatic color.

(5) The scan data of the above-described embodiment and modifications is not limited to data generated by a so-called scanner but may be data generated by optically reading a document. For example, the scan data includes data generated by photographing the document using a digital camera.

(6) In the above-described embodiment and modifications, an image processing function of the scanner driver 100 of the computer 200 may be implemented in a device such as the scanner 300, a multifunction machine, or a digital camera. In this case, such a device may perform image processing for the scan data that the device itself generates to generate the image-processed scan data and output the image-processed scan data to a computer (personal computer, etc.) communicably connected thereto.

Generally, a device that realizes the image processing function of the scanner driver 100 is not limited to the computer 200, but may be a multifunction machine, a digital camera, a scanner, or the like. Further, the image processing function may be realized by a single device or a plurality of network-connected devices. In the latter case, a system provided with the plurality of devices that realize the image processing function serves as the image processing device.

(7) In the above-described embodiment and modifications, a part of the configuration realized by hardware may be replaced by software and, conversely, a part of the configuration realized by software may be replaced by hardware.

While the description has been made in detail with reference to the embodiment and modifications thereof, it would be apparent to those skilled in the art that various changes and modifications may be made therein without departing from the spirit of the above described embodiment.

What is claimed is:

1. An image processing apparatus comprising:
   a controller configured to:
      acquire scan data representing a scan image, the scan image including a plurality of pixels;
      acquire information about a specified color, the specified color being a color specified by a user;
      execute, if a predetermined condition is met, a first correction on at least a part of the scan data such that brightness of a pixel subject to the first correction increases, the pixel subject to the first correction having a color that falls within a specified range of color, the color that falls within the specified range of color including an achromatic color that is brighter than the specified color, first corrected scan data being generated resulting from execution of the first correction;
      execute, if the first correction is executed, a second correction on at least a part of the first-corrected scan data such that a color of a pixel subject to the second correction is changed to a predetermined color if the pixel subject to the second correction is a specified color pixel specified based on information about the specified color, second corrected scan data being generated resulting from execution of the second correction on the first corrected scan data; and
      output the second corrected scan data if the second correction is executed.

2. The image processing apparatus according to claim 1, wherein the brightness of the pixel subject to the first correction is changed to maximum brightness if the brightness of the pixel subject to the first correction is brighter than or equal to a threshold brightness.

3. The image processing apparatus according to claim 1, wherein, if the brightness of the pixel subject to the first correction is darker than the threshold brightness, the pixel subject to the first correction is changed to a first correction pixel with a brightness determined according to a predetermined relation such that the brightness of the first correction pixel approaches to the maximum brightness as the brightness of the pixel subject to the first correction increases.

4. The image processing apparatus according to claim 2, wherein the controller is further configured to determine the threshold brightness based on the information about the specified color such that the brightness threshold becomes smaller as the specified color becomes darker.

5. The image processing apparatus according to claim 1, wherein the brightness of the pixel subject to the first correction is changed according a predetermined correction table.

6. The image processing apparatus according to claim 5, wherein brightness of a pixel included in the scan image and having a color darker than the specific range of color is unchanged in the first correction.

7. The image processing apparatus according to claim 1, wherein the information about the specified color includes color values defined in a specific color space and a hue width value indicative of a width of a range in hue;
wherein the second correction is executed based on the color values and the hue width value.

8. The image processing apparatus according to claim 7, wherein the controller is further configured to determine whether a hue of the pixel subject to the second correction falls within a range of hue, the range of hue being centered at a specified hue that is based on the color values and having a width based on the hue width value;
wherein the predetermined color is a color having maximum brightness;
wherein the color of the pixel subject to the second correction is changed so as to approach the predetermined color if the hue of the pixel subject to the second correction falls within the range of hue.

9. The image processing apparatus according to claim 8, wherein the second correction is executed using an amount of correction, the amount of correction becoming smaller as the hue of the pixel subject to the second correction separates from the center of the range of hue.

10. The image processing apparatus according to claim 1, wherein, if the first correction is executed, a color of a pixel included in the first corrected scan data and having a chroma higher than or equal to a predetermined chroma is unchanged in the second correction.

11. The image processing apparatus according to claim 1, wherein a color value of the pixel subject to the second correction is changed to a predetermined color value in the second correction, the color value of the pixel subject to the second correction being defined in a predetermined color space, the predetermined color space defining a component indicative of one of a brightness value and luminance.

12. The image processing apparatus according to claim 1, wherein the predetermined condition includes a condition that the specified color falls within a prescribed range of color;
wherein both the first correction and the second correction are executed if the specified color falls within the prescribed range of color;
wherein the second correction is executed on the scan data without executing the first correction if the specified color is outside the prescribed range of color.

13. The image processing apparatus according to claim 1, wherein the controller is further configured to determine a range of at least one of hue and chroma that are based on the information about the specified color;
wherein the pixel subject to the first correction has a color falling within the range of at least one of hue and chroma;
wherein a pixel included in the scan data and having a color outside of the range of at least one of hue and chroma is unchanged in the first correction.

14. A non-transitory computer readable storage medium storing a set of program instructions executed by a computer, the program instructions comprising:
acquiring scan data representing a scan image, the scan image including a plurality of pixels;
acquiring information about a specified color, the specified color being a color specified by a user;
executing, if a predetermined condition is met, a first correction on at least a part of the scan data such that brightness of a pixel subject to the first correction increases, the pixel subject to the first correction having a color that falls within a specified range of color, the color that falls within the specified range of color including an achromatic color that is brighter than the specified color, first corrected scan data being generated resulting from execution of the first correction;
executing, if the first correction is executed, a second correction on at least a part of the first-corrected scan data such that a color of a pixel subject to the second correction is changed to a predetermined color if the pixel subject to the second correction is a specified color pixel specified based on the information about the specified color, second corrected scan data being generated resulting from execution of the second correction on the first corrected scan data; and
outputting the second corrected scan data if the second correction is executed.

15. The non-transitory computer readable storage medium according to claim 14, wherein the brightness of the pixel subject to the first correction is changed to maximum brightness if the brightness of the pixel subject to the first correction is brighter than or equal to a threshold brightness.

16. The non-transitory computer readable storage medium according to claim 14, wherein, if the brightness of the pixel subject to the first correction is darker than the threshold brightness, the pixel subject to the first correction is changed to a first correction pixel with a brightness determined according to a predetermined relation such that the brightness of the first correction pixel approaches to the maximum brightness as the brightness of the pixel subject to the first correction increases.

17. The non-transitory computer readable storage medium according to claim 15, wherein the program instructions further comprise determining the threshold brightness based on the information about the specified color such that the brightness threshold becomes smaller as the specified color becomes darker.

18. The non-transitory computer readable storage medium according to claim 14, wherein the brightness of the pixel subject to the first correction is changed according a predetermined correction table.

19. The non-transitory computer readable storage medium according to claim 18, wherein brightness of a pixel included in the scan image and having a color darker than the specific range of color is unchanged in the first correction.

20. An image processing apparatus comprising:
   means for acquiring scan data representing a scan image, the scan image including a plurality of pixels;
     means for acquiring information about a specified color, the specified color being a color specified by a user;
     means for executing, if a predetermined condition is met, a first correction on at least a part of the scan data such that brightness of a pixel subject to the first correction increases, the pixel subject to the first correction having a color that falls within a specified range of color, the color that falls within the specified range of color including an achromatic color that is brighter than the specified color, first corrected scan data being generated resulting from execution of the first correction;
   means for executing, if the first correction is executed, a second correction on at least a part of the first-corrected scan data such that a color of a pixel subject to the second correction is changed to a predetermined color if the pixel subject to the second correction is a specified color pixel specified based on the information about the specified color, second corrected scan data being generated resulting from execution of the second correction on the first corrected scan data; and
   means for outputting the second corrected scan data if the second correction is executed.

* * * * *